May 13, 1969 G. F. WYSOWSKI 3,443,781
FOOD SERVER
Filed April 3, 1967 Sheet 1 of 2
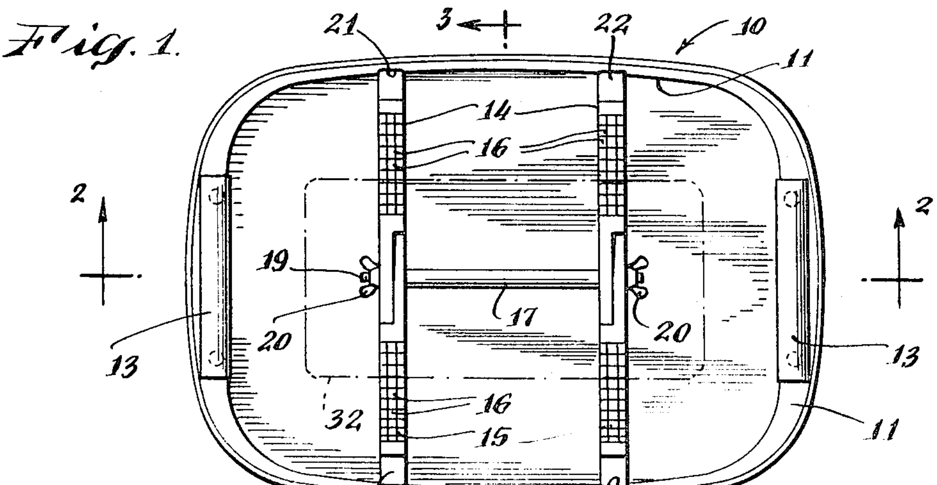
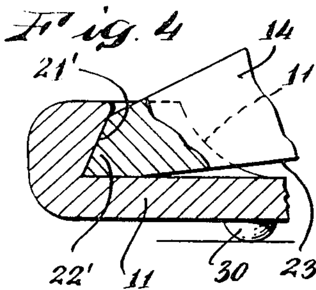
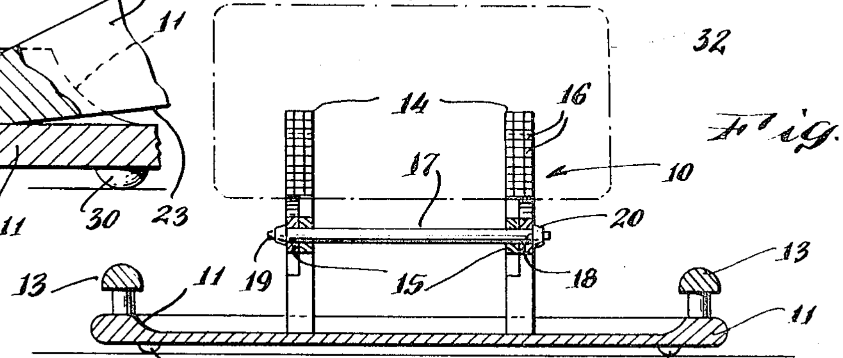
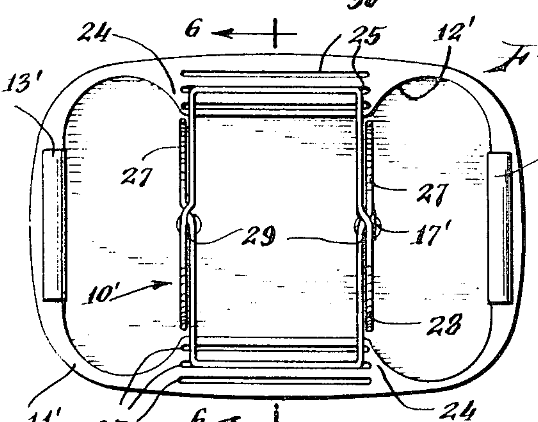
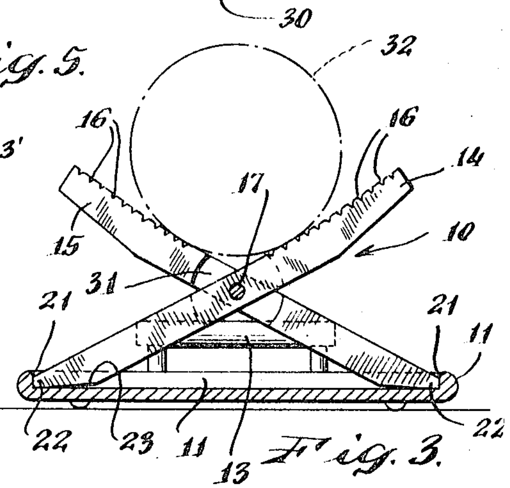
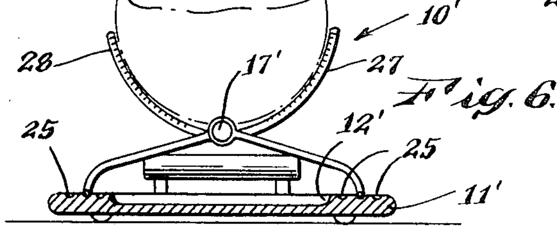
INVENTOR.
George F. Wysowski
BY
Roy L. Parsell
ATTORNEY.

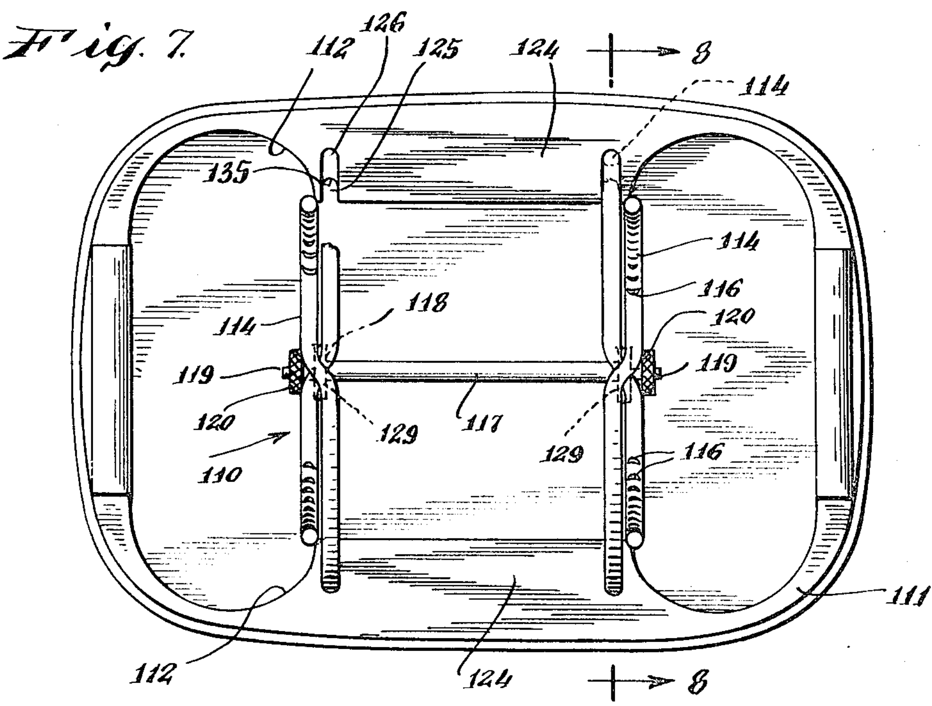
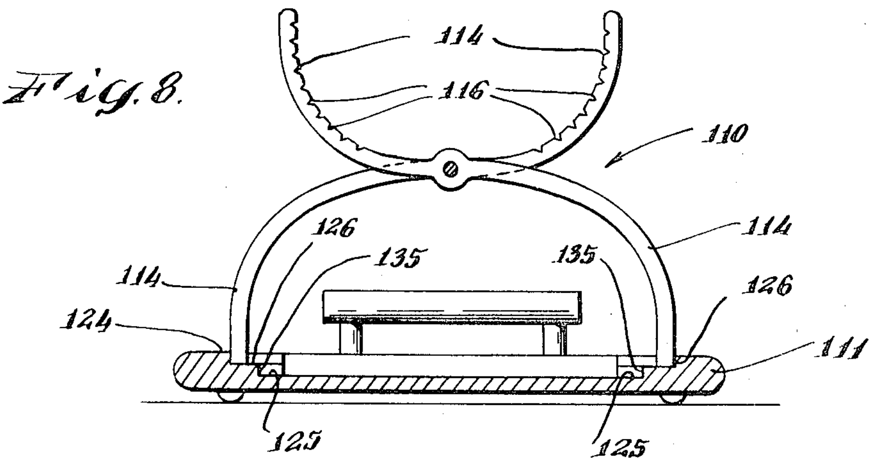
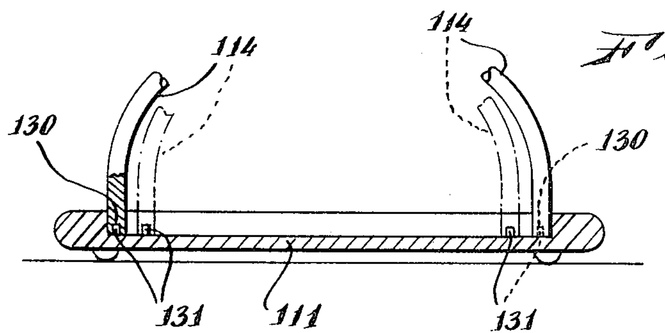
INVENTOR.
George F. Wysowski
BY
Roy L. Parsell
ATTORNEY.

United States Patent Office 3,443,781

Patented May 13, 1969

3,443,781

FOOD SERVER

George F. Wysowski, Box 368, 23 Neck Road, Clinton, Conn. 06413

Filed Apr. 3, 1967, Ser. No. 628,095
Int. Cl. F16m *11/38*
U.S. Cl. 248—164 9 Claims

ABSTRACT OF THE DISCLOSURE

A device for holding an article of food from which portions are to be served usually by carving such as a roasted turkey or similar type of food piece. The device comprising essentially a cradle like member detachably mounted on a platter like base to support the food piece above the base. The cradle member having a structure resembling a pair of tongs which may be adjustable to close in on the food piece to not only support but hold the food piece from moving while being carved. The base provides means for also maintaining the cradle in position, but also for receiving droppings from the food piece and portions which have been carved off.

My invention relates to a device for holding food to be served and in particular one in which the food may be sliced or carved at the place of serving, be it the dining table, restaurant counter or kitchen.

Improvements over the past have been made to the common platter or tray such as providing a plurality of sharp upwardly protruding pins fixed in the base of the platter, tray or carving board to prevent the piece of food such as a meat roast or turkey from sliding as it is under the pressure of the fork and the knife. The pins tend to tear the surface of the piece and the knife must engage the surface of the platter at times and should the latter be metal it would be detrimental to the knife edge. Also frame devices are used to clamp or otherwise hold the pieces and thus interfere with the knife edge at times.

Hence some of the objects of my invention are to provide means to correct these objectionable features. One of which is to firmly hold the article of food which is to be carved or sliced from sliding without mutilating the surface of the piece.

Another object is to position the piece in spaced relation to the tray or platter so that the knife will not engage the platter.

Still another object is to provide a holding means which will present a minimum interference with the cutting edge of the knife.

Other objects, advantages and novel features of the invention will become apparent from the following detailed description of the invention when considered in conjunction with the accompanying drawings wherein:

FIGURE 1 is a plan view of one embodiment of my invention showing a wooden cradle mounted on a wooden platter;

FIGURE 2 is a longitudinal sectional elevation taken on line 2—2 of FIGURE 1;

FIGURE 3 is an end elevation taken on line 3—3 of FIGURE 1;

FIGURE 4 is a vertical section on line 3—3 of FIGURE 1 showing another embodiment somewhat enlarged;

FIGURE 5 is a plan view of still another embodiment;

FIGURE 6 is an end elevation taken on line 6—6 of FIGURE 5;

FIGURE 7 is a plan view of a preferred embodiment;

FIGURE 8 is a sectional elevation on line 8—8 of FIGURE 7;

FIGURE 9 is a vertical section in part taken on line 8—8 of FIGURE 7 but modified to show pins inserted in base to be received in sockets in leg-arm members.

Referring now to the drawings, one of my embodiments as shown in FIGURES 1 to 4 in which numeral 10 denotes a cradle for holding a food piece 32 mounted on a patter like base 11 with the lower ends of the leg portins 14 and 15 being received in recesses 21 to retain the cradle 10 against lateral and longitudinal movement.

In this embodiment the base 11 and arm-leg members (14–15) of the cradle 10 are preferably made of wood which can be attractively finished for use on a dining table for holding a food piece 32 such as a roasted turkey.

The arm-leg members 14 and 15 are provided with a countersunk portion or recess 31 (FIGURE 3) at approximately their centers to enable the arm-leg members 14 and 15 to be crossed and fitted together in pairs to form the respective ends of the cradle 10. The ends of the cradle 10 thus formed are united in spaced relation by an axle like member 17 having a shoulder 18 at each end acting as an abutment for the arm-leg members 14–15 when they are secured in position on the ends of the axle 17 by means of wing nuts 20 threaded on the axle ends 19. Serrations 16 are made on the upper surfaces of the arm portions of the arm-leg members 14 and 15. The weight of the food piece 32 in the cradle 10 continually maintains the lower ends of the legs 14 and 15 in their respective notches or recesses 21. Also when clamping means such as wing nuts 20 are used the spread of the leg portions may be held fixed by the wing nuts 20.

The base or platter 11 is slightly hollowed out to catch any small pieces or liquid coming from the food piece above.

Various lengths of axle 17 may be used to accommodate different sizes of the food piece. Knurled nuts may be used instead of wing nuts 20 or the ends of the axle may be riveted or peened over in case it is not necessary to change axles or remove the arm-leg members for cleaning.

In addition to securing the cradle 10 against horizontal movement the other embodiment shown in FIGURE 4 provides a dovetail like structure for the recess 21 having the edges thereof sloped inwardly to engage the bottom ends of the legs 14–15 to retain them against upward movement.

Another embodiment is shown in FIGURES 5 and 6 having a hollowed out base $\mathbf{11^1}$ provided with an inwardly extending peninsular portion 24 (FIG. 5) which is provided with longitudinally extending grooves to receive the bottom portions of arm-leg members 27 and 28 of U-shaped cradle $\mathbf{10^1}$. These arm-leg members 27 and 28 are pivotally mounted in pairs to form the cradle $\mathbf{10^1}$ by short axle members $\mathbf{17^1}$. By locating the bottom of the U-shaped arm-leg members 27–28 in the respective grooves $\mathbf{25^1}$ the capacity of the cradle $\mathbf{10^1}$ may be varied to accommodate varying sizes of the food piece.

The short axles $\mathbf{17^1}$ may be secured by riveting the ends or providing knurled or wing nuts for purposes similar to the first embodiment above. In this second embodiment the arm-leg members 27–28 are preferably of a metal rod formed into a U-shape and provided with knurls or serrations $\mathbf{16^1}$ to engage the food piece.

A third and preferable embodiment is shown in FIGURES 7 and 8. This embodiment is generally similar to the second or immediate previously described embodiment except that the peninsular 124 need not be as extensive as peninsular 24 and the cradle portion 110 is analogous to cradle 10 of the first embodiment but formed of metal rods.

The anchoring recesses 125 and 126 which receive the lower ends of the arm-leg members 114 are essentially holes drilled vertically to reduce cost of fabrication. The bottom of the outside hole 126 is at a higher level than the bottom of hole 125. The holes are connected together horizontally and with the well portion 112 so that depending on the size of the desired opening to receive the food piece in the cradle portion, the bottom of the legs 114 are rested in the respective appropriate recess or hole. It will be observed that the ledge 135 formed by the difference in levels of the bottoms of holes 125 and 126 thus provides an abutment to prevent the lateral spreading of the legs when the cradle 110 is positioned for a smaller food piece.

The cradle 110 is made by mounting the formed metal rods, constituting the arm-leg members 114, to an axle 117 preferably of the same rod stock as are the arm-leg members 114. The mounting may be similar to that described in the first embodiment, i.e. with abutment shoulder on the axle 117 and with knurled nut 120 threaded (119) to fixedly clamp the arm-leg members 117 in the desired position or by riveting over the ends of the axle.

In describing recess means to be engaged by leg members for retaining the cradle in place I do not wish to limit my invention merely thereto as companion pins and sockets (FIGURE 9) may be used instead of recesses as for example inserting a plurality of upstanding spaced pins 131 on a pair of opposite sides of the area on the top side of the base which pins are received in sockets 130 on the corresponding leg members or vice versa.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A food server comprising, a plate-like base member for receiving a cradle, a cradle having a pair of longitudinally spaced end portions adapted to be positioned at opposite ends of said base member, longitudinally extending means connected to said cradle end portions for maintaining said end portions in spaced relationship, each said cradle end portion comprising a pair of members, means pivotally connecting said members at a point intermediate the ends thereof, the portion of the members on one side of the pivotal connection constituting arms for engaging a food piece, and the portion of the members on the opposite side of said pivotal connection constituting legs for engaging said base member, and a plurality of leg retaining means formed on opposite sides of said base member and being laterally disposed for selectively receiving the cradle legs in a selected adjusted position, whereby the distance between the respective legs at each end portion of the cradle can be varied to effect a proportionate variation of the spread between corresponding arms to thereby accommodate food pieces of various sizes.

2. A food server according to claim 1 wherein the longitudinally extending means for maintaining the cradle end portions in spaced relationship comprises, an axle member extending from the pivotal connection at one of the cradle end portions to the pivotal connection at the other cradle end portion.

3. A food server according to claim 1 wherein the longitudinally extending means for maintaining the cradle end portions in spaced relationship comprises, an elongated member connecting the end of each leg at one end portion of the cradle to the end of the corresponding leg at the opposite end portion of the cradle.

4. A food server according to claim 1, wherein the laterally disposed leg retaining means comprises a plurality of spaced recesses having stepped bottoms for receiving the cradle legs.

5. A food server according to claim 1, wherein the laterally disposed leg retaining means comprises cooperating pin and socket means, formed on said legs and base member.

6. A food server according to claim 1, wherein the laterally disposed leg retaining means comprises a plurality of elongated grooves extending parallel to said opposite sides of said base member.

7. A food server according to claim 3, wherein the laterally disposed leg retaining means comprises a plurality of elongated grooves extending parallel to said opposite sides of said base member, said elongated members being positioned within a selected pair of elongated grooves.

8. A food server according to claim 1, wherein the upper surface of the base member has a depressed portion for catching and retaining droppings from the food piece.

9. A food server according to claim 8 wherein a peninsular portion projects inwardly from each side of said base member, said leg retaining means being formed on said peninsular portions.

References Cited

UNITED STATES PATENTS

| | | | |
|---|---|---|---|
| 218,607 | 8/1879 | Weber | 297—24 |
| 415,841 | 11/1889 | Lee | 108—119 |
| 1,205,774 | 11/1916 | Mitchell | 146—216 |
| 1,343,526 | 6/1920 | Smith | 248—173 |
| 2,338,296 | 1/1944 | Meyer | 146—216 |
| 2,711,765 | 6/1955 | Pecoraro | 146—216 |
| 3,095,974 | 7/1963 | Perini | 211—178 |
| 3,139,845 | 7/1964 | Kolinski | 108—119 |
| 3,298,537 | 1/1967 | DiMarco | 211—178 |
| 3,308,864 | 3/1967 | Glaus | 146—216 |

FRANCIS K. ZUGEL, *Primary Examiner.*

U.S. Cl. X.R.

146—216; 248—173